(12) United States Patent
Kolodziej

(10) Patent No.: US 8,718,614 B2
(45) Date of Patent: May 6, 2014

(54) CONCIERGE

(75) Inventor: Kris Kolodziej, Hoboken, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 122 days.

(21) Appl. No.: 13/401,619

(22) Filed: Feb. 21, 2012

(65) Prior Publication Data

US 2013/0217366 A1 Aug. 22, 2013

(51) Int. Cl.
 *H04M 3/42* (2006.01)
 *H04W 4/02* (2009.01)
 *H04W 4/00* (2009.01)

(52) U.S. Cl.
 CPC .............. *H04W 4/021* (2013.01); *H04W 4/023* (2013.01); *H04W 4/008* (2013.01); *H04W 4/025* (2013.01)
 USPC .................. 455/414.1; 455/416.2; 455/456.3; 455/457

(58) Field of Classification Search
 CPC ..... H04W 4/021; H04W 4/023; H04W 4/008; H04W 4/025; H04W 4/026
 USPC .......................... 455/414.1, 456.2, 456.3, 457
 See application file for complete search history.

(56) References Cited

U.S. PATENT DOCUMENTS

| 7,869,941 | B2 | 1/2011 | Coughlin et al. |
| 7,941,753 | B2 | 5/2011 | Meisels et al. |
| 2008/0132251 | A1* | 6/2008 | Altman et al. ................ 455/457 |
| 2010/0291950 | A1* | 11/2010 | Lin et al. .................... 455/456.3 |
| 2012/0058782 | A1* | 3/2012 | Li .............................. 455/456.2 |
| 2012/0108268 | A1* | 5/2012 | Lau et al. ................... 455/456.3 |

* cited by examiner

*Primary Examiner* — David Q Nguyen

(57) ABSTRACT

Providing a contextual reminder to a mobile station includes determining a locus of the mobile station based on the position of the mobile station in both time and space. A first entry is read, where the first entry can be at least a task or an event. Both tasks and events can include a time, a date, and/or a location. The locus and the first entry can be compared to determine if the contextual reminder should be provided to the mobile station. The contextual reminder can be provided to the mobile station based on the comparison. The reminder can be provided when at least one of the time, the date and the geographical position of the mobile station is proximate to at least one of the time, date, and location of the entry.

16 Claims, 10 Drawing Sheets

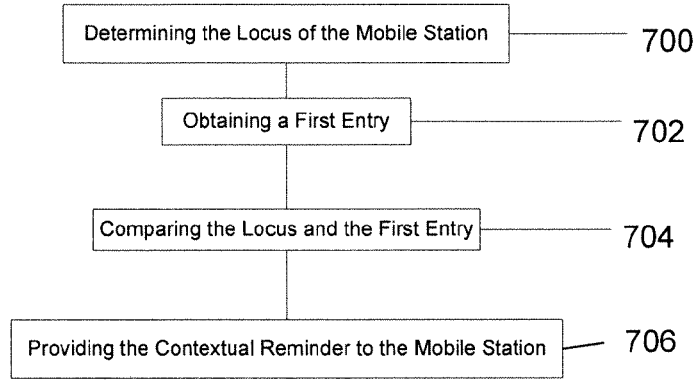
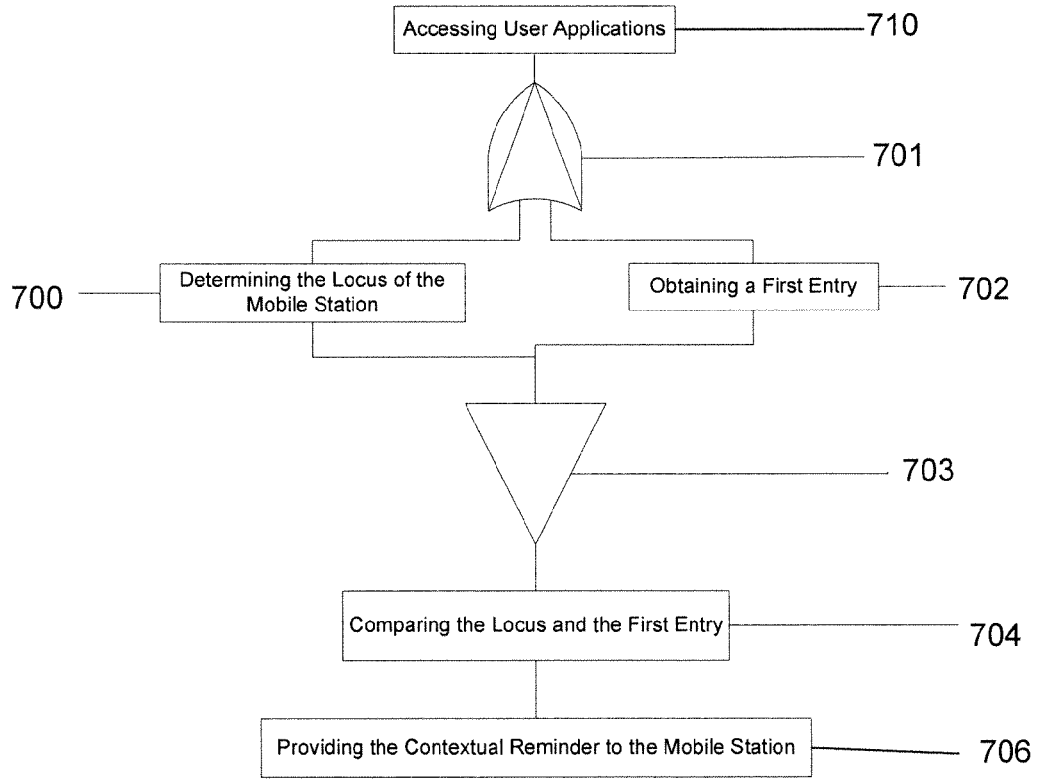

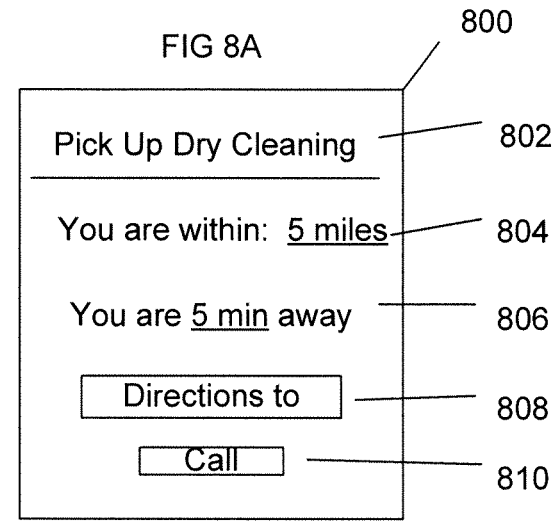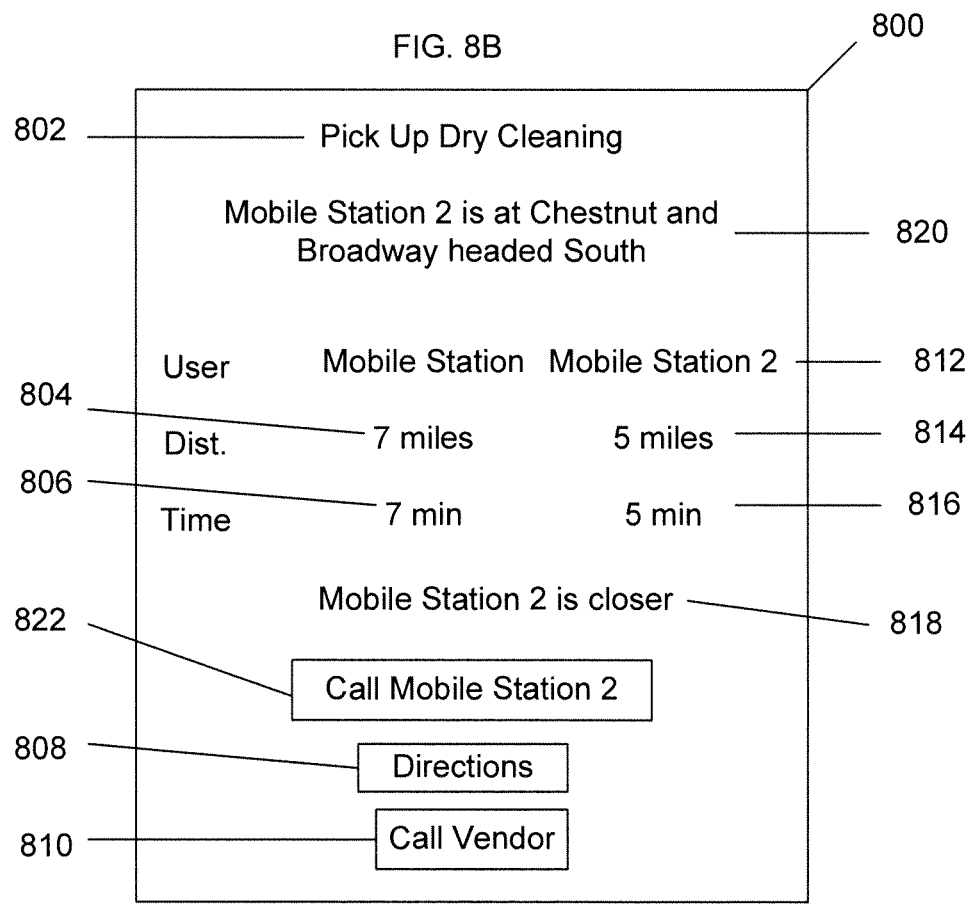

CONCIERGE

BACKGROUND INFORMATION

In recent years, more and more users rely on their mobile devices to act more like personal assistants. Users set alarms, calendar dates and reminders, and generate "to-do" lists, all on the mobile device. The next generation of applications can now remind users based on various parameters. However, the different types of reminders and lists provided by such applications lack context within a user's daily routine. It is up to the user to set the reminders according to what she believes will be her schedule in the future.

Hence a need exists for an application that can learn and adapt to a user's schedule and surroundings and provide reminders accordingly.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 7A-7E are flow charts illustrating examples of methods.

FIGS. 8A and 8B illustrate examples of contextual reminders.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a concierge application that can provide reminders based on the context of the user's schedule.

Figure 1:
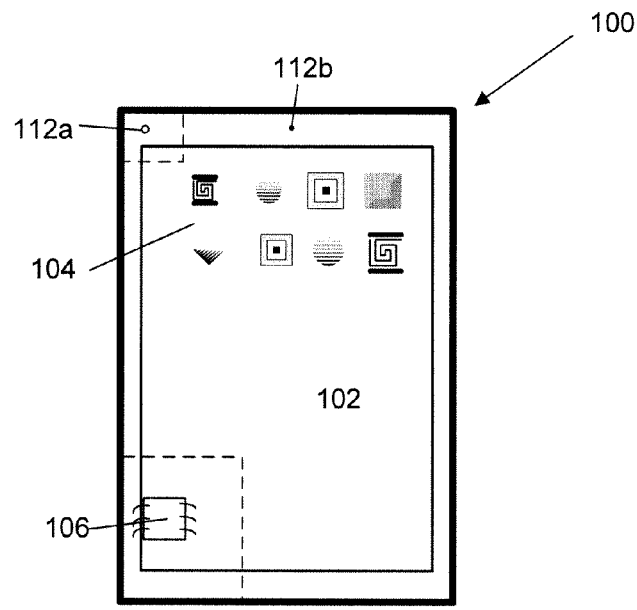
FIG. 1 illustrates an example of a mobile station.

Reference now is made in detail to the examples illustrated in the accompanying drawings and discussed below. FIG. 1 illustrates a basic mobile station 100. The mobile station 100 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors. The mobile station 100 can access at least the cellular network and/or WiFi network for voice communications (i.e. telephone calls, push-to-talk, etc.) and/or data transfer.

The mobile station 100 can be used as a GPS device, a camera, an audio and video playback device, utilize the Internet, and send and receive e-mail and text messages. It can include a touch screen 102 to display icons 104 representing the applications present on the mobile station 100. The mobile station can also include a global positioning system ("GPS") chip 106. The GPS enabled mobile station 100 can be used to determine the mobile station's location and provide directions, access a database of attractions and businesses to search, and can receive real-time traffic information. The GPS application or the mobile station 100 also typically has a voice component to speak the turn-by-turn directions to the user. The mobile station 100 can also have one or more cameras, one outward facing camera 112a and/or one user facing camera 112b.

Figure 2:
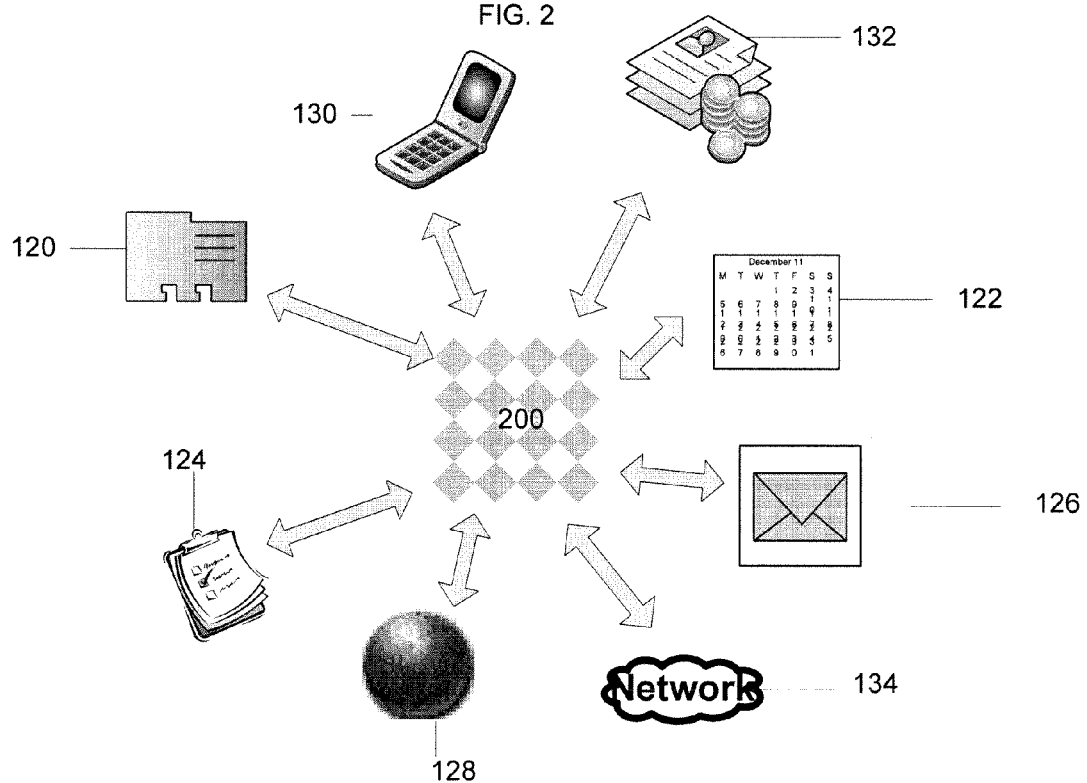
FIG. 2 illustrates a concierge application interfacing with user applications.

Typically, the mobile station 100 also includes user applications for the user to organize her work and personal life. User applications can include a contact list 120, calendar 122, to-do list 124, e-mail 126, GPS application 128, phone applications 130 and financial applications 132. The concierge application 200 can interface with the user applications to access their data and monitor them for additional information. FIG. 2 illustrates the concierge application 200 interfacing with certain user applications.

Monitoring a user application can involve searching through the data collected by that application for at least key words, dates, events, addresses, coordinates, names, notes and telephone numbers. The concierge application 200 can monitor both past and new entries. Monitoring can also involve cross-referencing data from one application to another. For one example, the concierge application 200 can monitor the GPS application 128 and as it detects the address entered into the GPS application 128, can access the contact list 120 to determine the name of the address entered and the corresponding telephone number. More detailed examples are noted below.

The user applications interfaced by the concierge application 200 can be determined by the user during set up of the concierge application 200 or at any time after set up, including during the installation of a new user application. This can allow the user to exclude or include particular applications. Also, the concierge application 200 can present a list of every application on the mobile station 100 to the user for selection. Alternately, the concierge application 200 can present a list of default applications to automatically interface with. The default list can be generated by the manufacturer of the concierge application 200 and updated at intervals. A combination of listing the applications and providing for user input can be presented to the user.

Once interfaced, the concierge application 200 can start to go through the data and begin learning about the user and monitoring activities. The concierge application 200, in one example, can determine frequented locations and set them as defaults for whatever that location offers.

The determination of a regular or frequent location can be determined numerous ways. It can be by default, (e.g. the user's home and work addresses), set by the user, or determined from other applications. The number of times a particular location is identified by the concierge application 200 to qualify as "frequent" can be preset by one or both of the manufacturer or the user. Frequency can be determined by the number of times a location is detected and/or the number of detections over a specified period of time.

Service providers, like doctors and auto mechanics, who a user visits sporadically or has long intervals between visits can be determined based on one or very few visits and within no set period of time. Destinations to venders or services providers that have a higher frequency of visits, like dry cleaners and supermarkets, can have a detection period if the location is detected once a week. For intermittently visited locations, like restaurants or shopping malls, the detection period can be longer, for example, if the location is detected once a month.

Detecting a location, and the number of times it is frequented, can be determined multiple ways. The concierge application 200 can be set to utilize only one or multiple locations detections to determine frequency. One example of location detection is that the user applications can be monitored for locations. In particular, the concierge application 200 can monitor the GPS application 128 for locations that are pre-programmed by the user. Further, the GPS application 128 can be monitored for locations the user frequents, i.e., where the user stops on a regular basis or for long periods of time, or both. The calendar 122 and to-do list 124 can be monitored for recurring names of locations. The contact list 120 may also have an indication of "favorites." The phone applications 130 can be monitored for calls to specific locations, for example, to identify a user making reservations or ordering take-out. Further, the financial applications 132 can be monitored for account activity. Numerous purchases from the same location can also be an indication of frequency.

The concierge application 200 can also reference a location for a specific activity or understand it is frequented only at specific times. In one example, the concierge application 200 accesses the user's GPS application 128 to determine where the user spends portions of their days and weeks. For example, if the user is always at the same location during business hours (e.g. Monday-Friday, 9 am to 5 pm), the concierge application 200 can consider that the user's "workplace." The same is true for the location the user is predominantly at after business hours and on the weekends—this can be designated as "home." Alternately, or in addition to, the concierge application 200 can access the contact list 120 to determine these locations or confirm the locations provided by the GPS application 128.

In addition to the above, part of the monitoring can be the concierge application 200 monitoring for repetitive actions and asks the user to categorize it. For example, the user likely travels to work/school at the same time every day and typically using an identical route. After a certain numbers of repetitions, the concierge application 200 can query the user so the user can input "work travel." Alternately, if the user's work address is in the user's contacts, the concierge can determine, by the destination, that this is the user's work travel time.

Also, if the concierge application 200 identifies the work commute or school travel times, it can automatically check the weather/traffic/mass transit schedule 15 minutes before the user's typical departure to provide an update if the user needs a coat or change in travel route or means. Identifying these routes can also help with contextual reminders (discussed below) and alerts, so the concierge application 200 knows when the user is out of work/school and the typical route the user can take.

Further, frequented locations can also be determined from accessing the contact list 120, the to-do list 124, and calendar 122. In an example, if the to-do list 124 notes "pick up dry cleaning," the concierge application 200 can access the contact list 120 to determine the address of the dry cleaner. However, if there is more than one dry cleaner listed, the concierge application 200 can monitor the user's locations to see which dry cleaner the user actually goes to. Instead of, or in addition to, constant monitoring locations, the concierge application 200 can monitor the to-do list 124 and once the task is marked as completed, the concierge application 200 can cross-reference the GPS application 128 and the contact list 120 to see if any of the possible dry cleaner locations were visited in the past 24 hours. The concierge application 200 can also query the user.

As the concierge application 200 begins to learn the user's routines, e.g. frequented locations, venders, restaurants, etc., the concierge application 200 can also be monitoring the user's e-mail 126, calendar 122, and phone application 130 for future events.

The events can include meetings, meals, and social events. For example, the concierge application 200 can monitor e-mail 126 or calendar entries 122 for the terms "lunch," "dinner," "take-out," "sushi," "pizza," and/or the names of restaurants in the user's contact list 120. The concierge application 200 can then make suggestions to the user for future actions.

In one example, the concierge application 200 detects an e-mail with the term "pizza," and it is addressed from a work colleague of the user. The concierge application 200 can query the user if a calendar entry should be made noting pizza with the colleague. If there is a time and date in the e-mail, (e.g. "tomorrow at noon") it can be set in the entry as well. In addition, if the user has a favorite pizza parlor by work that has been identified, the concierge application 200 can query the user if that is the place the user and the colleague are going for pizza.

The concierge application 200 can determine the "relationship" between the user and any other person or entry in the contact list numerous ways. If the person is in the contact list 120, there may be an entry or category for the person (e.g. friend, work, family). Also, a common last name between the user and the person may also be an indication of a family member. Other indications can be a common domain name in the person's e-mail (e.g. both the user and person have @VerizonWireless.com in their work e-mail) or a common telephone area code and exchange.

Continuing the above example, since the concierge application 200 can determine that the email recipient is a work colleague, it can preset or query the user as to which pizza restaurant by looking in the contact list 122 for pizza restaurants in the vicinity of the user's work. As above, if the user frequents one pizza restaurant over others, that phone number and location can be set as the default. Also, the concierge application 200 can look at past calendar entries 122 to see if the user and the colleague had previously went to a pizza parlor and select that restaurant as a default.

To continue with the above example, the concierge application 200 may detect the calendar entry of lunch with the colleague and offer restaurant suggestions based on the user's preferences or notes regarding the colleague, or remind the user to make reservations at the restaurant listed in the entry. The concierge application 200 can provide the user with the restaurant's phone number, or with the user's approval, access a network to carry at least data 134 and make a reservation on-line. The reminder may be provided a set time period before the lunch, for example, the 24 hours before if the lunch is scheduled at least one day in the future, or one or more hours before the lunch if scheduled under 24 hours before.

Furthermore, the concierge application 200 can detect from the phone applications 130 a call to a particular restaurant and then ask if it was for reservations, and add the appropriate calendar entry 120, or if the user identifies the call is for take-out, the concierge application 200 can set an alarm to remind the user to pick up the food. The alarm can be defaulted to, for example, 20 minutes, or a time previously set by the user for each restaurant in the contact list 120.

The concierge application 200 can also populate the user applications. For the user applications that are linked to the concierge application 200, numerous factors can be used to indicate that information should be cross-referenced or updated. An indication can be when new information is entered into one user application. Settings can be available that cause any information, e.g., a contact, a location, a phone number, an address, or a name, to be shared with all or some of the other user applications and placed in the appropriate category. The sharing of information can be automatic, or performed by the user once provided a contextual reminder. Other settings can limit which user applications are monitored and to which user applications each piece of information is shared.

For example, when the user goes to a location, as determined by the GPS application 128, the concierge application 200 can determine that the location is not saved in the other user applications, e.g., the contact list 120, and prompt the user to input the location. Another example is that the user enters a restaurant name into a calendar entry 122. The concierge application 200 can prompt the user to enter the information, and access the network 134 to retrieve information regarding its address, directions, phone number, menu, cuisine, etc. It can also prompt the user if the GPS application 128 detects the user is inside the restaurant.

Another example of features of the concierge application 200 is contextual reminders. Typical reminders can be set that take into account one aspect for a user, e.g., time or location. Contextual reminders take into account two or more aspects before notifying the user. These aspects include, time, location, destination, other tasks and other calendar entries, all of which may have a bearing on whether the user should receive a reminder. Specific examples are discussed below. The concierge application 200 can monitor all of the user applications and make a determination of the best time and location, and take into account other factors, to remind the user. See also, FIGS. 8A and 8B.

Figure 3:
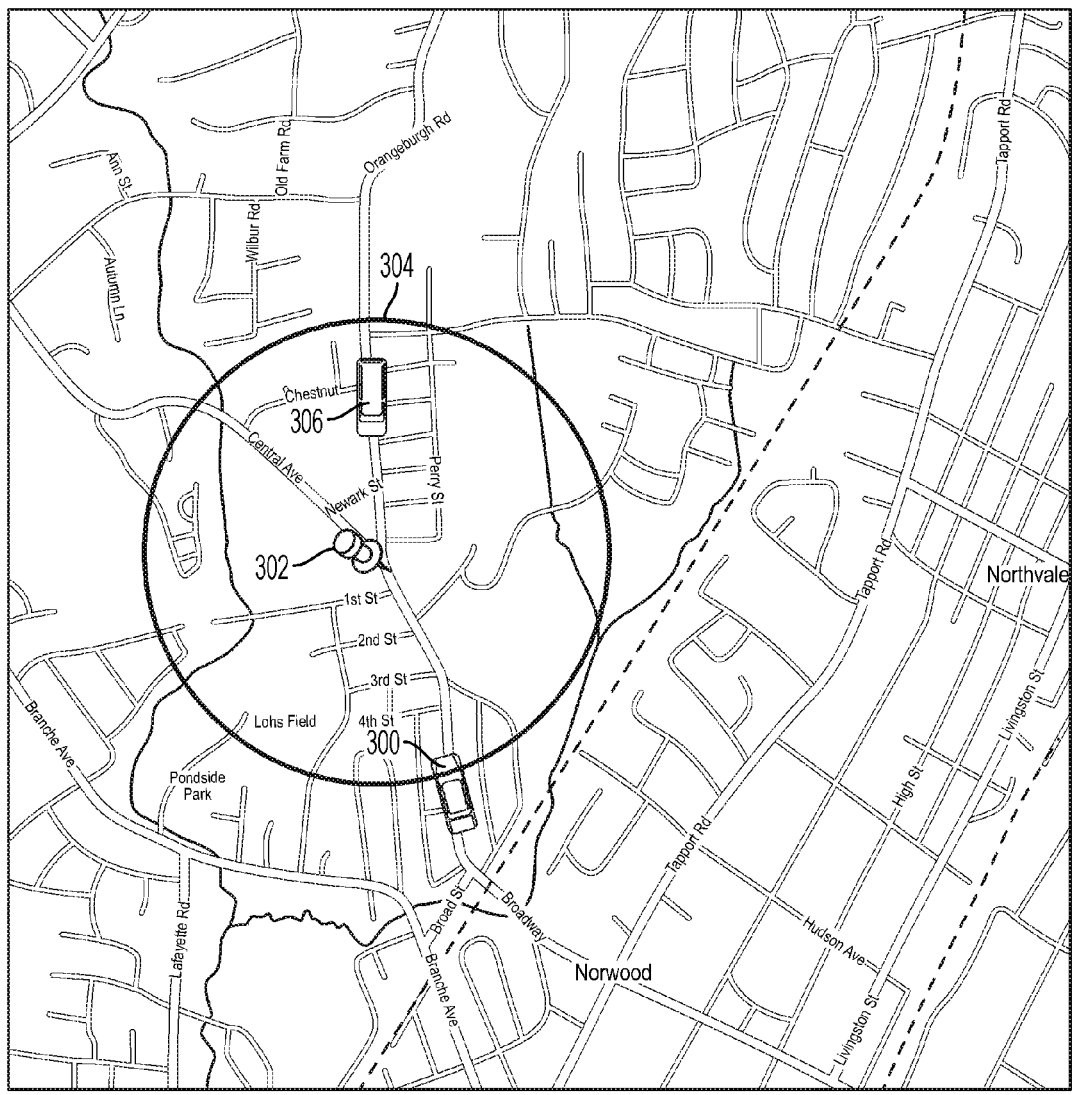
FIG. 3 illustrates an example of a distance and users for a contextual reminder.

In one example, illustrated in FIG. 3, the concierge application 200 can be aware of the user's calendar 122, to-do list 124, and favorite locations from the GPS application 128 to provide contextual reminders to the user. For example, the concierge application 200 detects a task on the user's to-do list 124, and the concierge application 200 can check the GPS application 128 to see if the user 300 is within a reminder distance 304 from the destination 302 for that task 302. For example, the task can be "pick up dry cleaning" and the destination can be the dry cleaners, whose location has been previously determined. However, before sending the alert, the concierge application 200 also checks the calendar 122 and notes that the user 300 has a meeting scheduled in 15 minutes. The concierge application 200 can query the GPS application 128 to determine the estimated travel time to the user's destination. A margin can be factored in for time to park the car and walk the remaining distance to the meeting location. The margin can be a preset time or can be entered by the user by location. For example, the user may be aware that it takes 10 minutes from where she parks to get to her work office, and can provide that to the concierge application 200 for future reference.

Further, the concierge application 200 determines that while the user is only 5 minutes from work, the margin is 10 minutes. Thus, the concierge application 200 determines that the user does not have time to stop, or she will be late for her meeting. Based on that analysis, the concierge application 200 does not send a reminder. However, when the user is on the way back from the meeting, when nothing else is pending on the user's calendar 122, the concierge application 200 sends a reminder/alert to the user to stop. In the above example, the concierge application 200 can check the calendar 122 for events. The concierge application 200 can calculate travel time using information from the GPS application 128 or can retrieve the information directly from the GPS application 128. The GPS application 128 can include geospatial services and can also determine the traffic conditions.

Additionally, if the user does stop, the concierge application 200 can send a reminder about the meeting and the possibility that the user will be late. Thus, the concierge application 200 noted the contexts, first that the user is within a notification distance of the dry cleaners. Next, based on the current time, current user location, future calendar entry and distance to destination, the concierge application 200 determined that it was not appropriate to send a reminder about picking up the dry cleaning. However, once the user stopped at the dry cleaners, the concierge application 200 determined that the user may be late to the meeting and sends a reminder regarding the meeting.

The reminder distance 304 can be a distance between the user and the location of an entry. The "distance" can be the separation in time, e.g., travel time, as well as the separation in position. The user can set a standard distance, or a distance for each location, or the distances can be preset. For example, the distance to the dry cleaner can be 5 miles or 5 minutes, as determined by the GPS application 128. The time to the location can be the estimated travel time.

In another example illustrated in FIG. 3, the user's concierge application 200 can be linked to the concierge application 200 for a second user 306. Tasks or events that are entered into one mobile station 100 can be linked to a second mobile station 100a. Linked concierge applications 200 are discussed in more detail below and the discussion surrounding FIG. 5 explains how two users can share entries. In this example, the concierge application 200 can determine that the task ("pick up dry cleaning") is linked, i.e., on both the user 300 and the second user 306 to-do lists, and that the second user 306 is closer to the destination 302. Along with an alert to the user 300, the concierge application 200 can notify the user 300 that the second user 306 is closer to the destination and offer to have the user 300 to call the second user 306 to coordinate the task.

Figure 4:
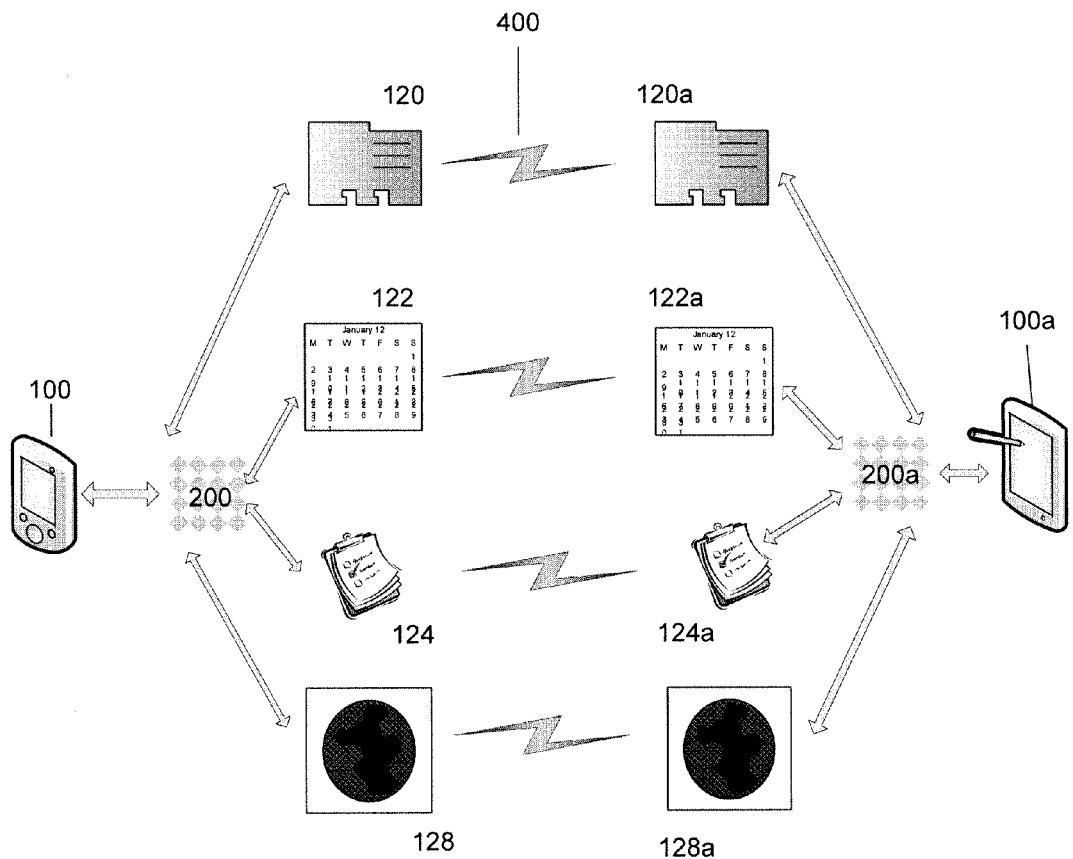
FIG. 4 illustrates linked concierge applications.

Turning to linked concierge applications 200, 200a, as illustrated in FIG. 4, each individual mobile station 100, 100a can run the concierge applications 200, 200a and the concierge applications 200, 200a can be linked. The linking of the applications 200, 200a can be prompted by the application once friends and family are determined, as discussed above. Alternately, a user 300 can manually choose to link his concierge application 200 with another concierge application 200a. Once linked, the concierge applications 200, 200a can share information regarding the user application it has access to. For example, the two concierge applications 200, 200a can link 400 contacts 120, 120a; calendars 122, 122a; to-do lists 124, 124a; and GPS locations 128, 128a. Other user applications can be linked, either automatically, by prompt, or manually by the user.

The mobile stations 100, 100a can be linked numerous ways. One is through direct synchronization, where the two devices need to be in close proximity, either being connected directly together or each linked directly to a common interface or computer. Other ways the data can be shared is uploading and downloading the changes from a cloud network. Further examples can be direct updates over a network, whether a cellular network, data network (e.g., Internet) 134, or a private network (e.g. LAN). The direct update example is best for real time coordination between the two concierge applications 200, 200a, as in the above example to determine which user is closest to the destination 302. In addition, certain information, for example, calendar events or to-do tasks can be stored and updated on a central server. Thus, both users can be viewing and editing the same centralized entries instead of having separate entries. Access to the shared entries can be through the specific user application or through the concierge application 200.

The concierge application 200 can, in some examples, choose what and when to synchronize between the two applications 200, 220a. It may be desirable for some entries to have real time updates while others, e.g., a calendar entry for an event in the future, may not necessarily desire real time updating. Parameters can be set, as either defaults or by user preference, as to when certain entries are updated over the link 400. In addition to selecting based on the type of entry, time intervals can be selected, In addition, the concierge application 200 can take into account network traffic (both cellular and data) provided to it by the network and determine the best time to transfer data when the traffic is low (as indicated by the network). Further, the concierge application 200 can account for the user's billing plan, and choose the best time to transfer the entry based on the least expensive option. The concierge application 200 can be aware of the user's accounts, for example, credit cards, cellular phone, checking, etc. Other user applications accessible to the concierge application 200 are the applications by third party service providers that allow a user to manage their account with that service provider.

Once linked, entries made by one user can be shared by the second user. Entries into the user applications can shared in different ways. For example, entries can be shared in a "view only" category. In this way, the second user is only aware of the entry, but has no rights to alter the entry. An "edit" category allows both users to edit the entry, with the edits reflected in both user's applications. There can be an "individual edit" category, where the initial entry is shared, but subsequent changes by either user are not automatically shared with the other. Another example of a category can be a "monitoring" category, in which one user creates an entry for the second user, and then can monitor the status of the entry. There can be also the option not to link the entry at all.

Figure 5:
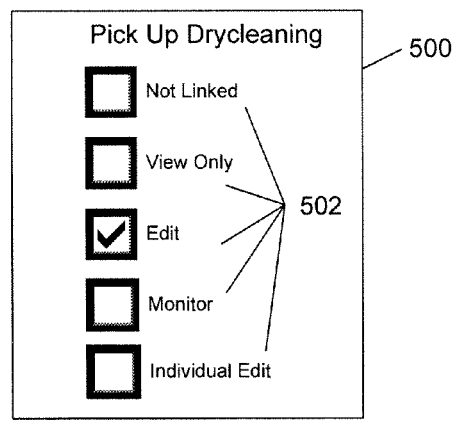
FIG. 5 illustrates an example of categories for an application entry.

FIG. 5 illustrates a new entry 500 in the to-list 124 of the user 100. In this example, the entry 500 provides the category options 502 to the user. The entry 500 is linked and editable by both users. In many of the categories, if a user completes the task, the second user's entry can be updated and the second user notified. To provide examples of the different categories, the user can create an entry, and leave it private and not linked, for example a doctor's appointment. Next, a "view only" entry can be "lunch with a work colleague," and the second user is not involved, so has no need to edit. However, this entry can allow the second user to know when the user is unavailable. An editable entry can be a shared task, like picking up the dry cleaning or food shopping. An individual edit entry can be a reminder to attend a training session held multiple times. Both users must attend, but they can attend at different times. A monitored task can be one that the originator of the task is not expected to perform but wants to provide the task to the second user and oversee the completion of the task.

The linked concierge applications 200, 200a can allow each user to be aware of the second user's progress and location. In the example above, illustrated in FIG. 3, it prevents both users from performing the same task, or allows for the allocation of the closest user to complete the task. Since the concierge applications 200, 200a can be spread over multiple mobile stations 100, 100a in a group or family, once the user marks a task as complete, the task can be automatically checked off the second user's to-do list 124a.

Figure 6:
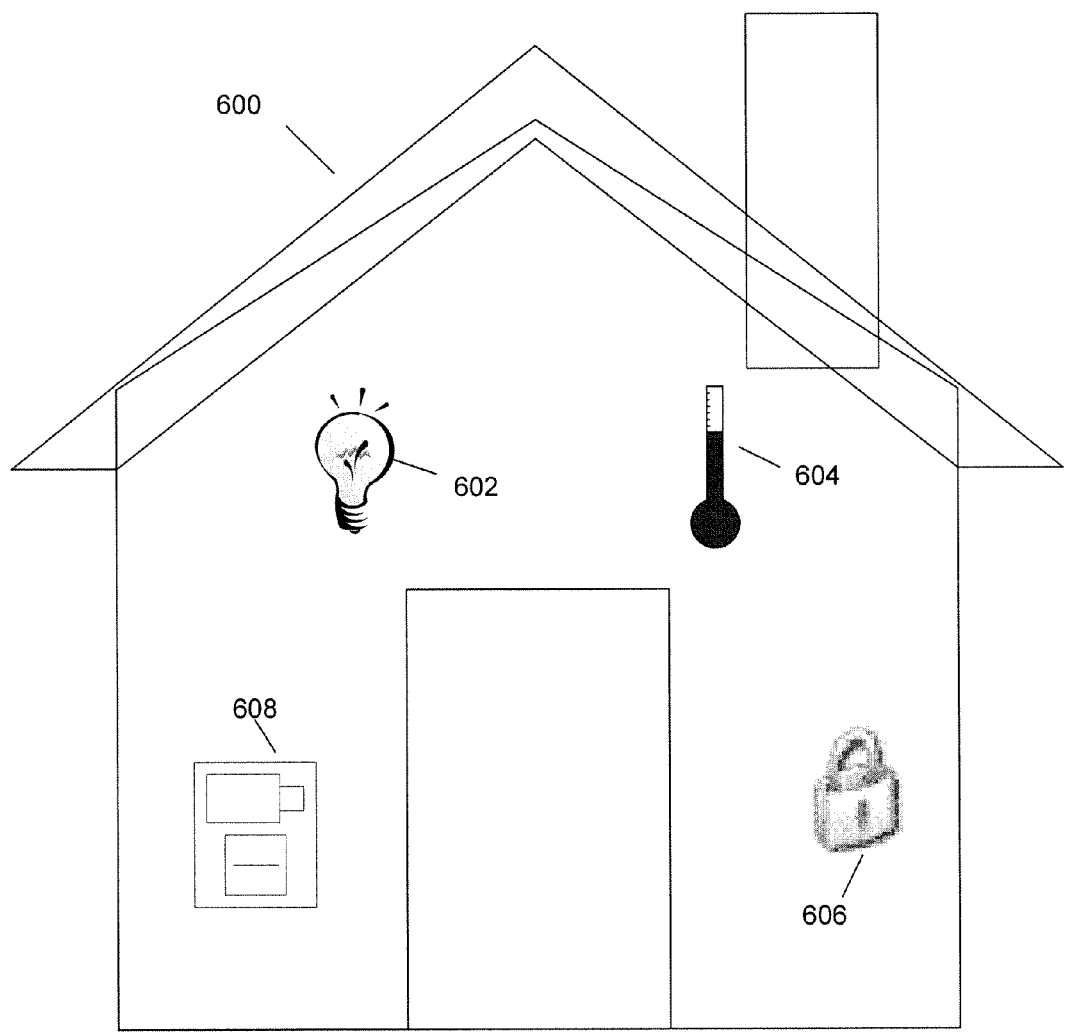
FIG. 6 illustrates an example of home monitoring sensors.

In other examples, the concierge application 200 can monitor more that user applications on the mobile station 100 for organization. Monitoring devices in the external environment can be linked to the concierge application 200. As illustrated in FIG. 6, portions of a user's house 600 or household appliances can be configured with scanners or monitors. The concierge application 200 permits contextualization of monitoring so that more information can be used to assist the user. Examples of devices that can be monitored include lights 602, thermostat 604, security/locks/alarm system 606, and other sensors 608.

For the lights 602, thermostat 604, and alarm 606, the concierge application 200 can activate the lights 602 and raise/lower the thermostat 604 based on either the calendar 122 entries or the mobile station 100 proximity to the house 600 based on the GPS location. Proximity to the house 600, e.g., defined by a user input to the concierge application 200, can also activate or deactivate the alarm 606. This allows the user to avoid manually entering code into a keypad in the house, for example. Alternately, the code for the alarm 606 can change based on user in proximity to the house 600. The changed code can be a reduction of the code string or different code strings for each user. Another example can be the ability to enter the alarm code on the mobile station 100 once within a certain distance to the house 600 or at any time, which may then be transferred to the alarm 606. Further, other uses can be notified that the alarm 606 has been activated or deactivated and which user is present in the house 600, through electronic communications such as instant messaging or email. Another alarm option may be the linked concierge application 200 determining that there are no users within a predetermined distance from the house 600 and the alarm 606 is not activated. The concierge application 200 can subsequently prompt the user to activate the alarm 606. Note that the various distances/proximities described throughout can be the same or different and may be set independently by the user.

The other scanners 608 can be or linked to smart devices in the user's home 600. For example, the user's refrigerator/freezer and/or pantry can be equipped with a product scanner (i.e. barcode or RFID), to allow the concierge application 200 to either access or maintain a foodstuffs inventory (including related items, e.g., paper goods, cleaning products, etc. and other consumables). The inventory can be compiled and maintained using different methods. One example can be the inventory is generated by the scanners which read the barcode or tag as the good is placed in or out of the refrigerator/freezer/pantry. Time limits can be set for the first time a product is scanned to set alarms for freshness, e.g. a one week time period for milk. Other time limits can be set to determine that if a product is removed from the refrigerator/freezer/pantry for a particular amount of time, it can be considered fully consumed and requires replenishing. An example is that if a item is not replaced in the refrigerator/freezer/pantry within 24 hours, it can considered consumed.

In another example, goods may be monitored using the receipt from the grocery store, allowing the concierge application 200 to determine what goods were purchased and are available. The receipts can be scanned in or accessed directly by the concierge application 200. One of the user applications that can be accessed is one for the supermarket that keeps track of the user's purchases. The concierge application 200 can access the supermarket application directly or the user's account on the supermarket's website by accessing the network 134, e.g., through a browser. An indication that certain goods have been purchased can be determined by the concierge application 200 accessing the GPS application 128 to see if the user stopped at a store, detecting the transaction with a grocery store in the financial application 132, or detecting the items was checked off the user's to-do list 124.

As the concierge application 200 continues to monitor the inventory, it can also learn the timing of when goods are replenished, and set a notice based on the replenishment cycle. For example, the concierge application 200 can detect that milk is purchased once a week, paper napkins are purchased monthly, and that cranberries and stuffing are only purchased once a year. In an example where the concierge application 200 compiles a list of items that need replenishing, it can enter items on the list based on the replenishment cycle. Other items can be flagged by the user as urgent, so an alert can be sent once the item is consumed. For example, milk may be considered an urgent item and as soon as the milk has run out, a notice is sent to the user's mobile station 100.

The concierge application 200 can also learn what products a user prefers and perform searches for coupons or sales on these items. The concierge application 200 can be preprogrammed or inputted by the user for sales cycles for each particular store and where to look for the coupons. The locations can include accessing the store's website over the network 134 or a user application for that store. For example, for groceries, the sales and coupon typically start every Sunday, for other retailers, it may be Wednesdays. Further, the concierge application 200 can be programmed for specific times, e.g. President's Week, Black Friday (the day after Thanksgiving), etc.

Additionally, the concierge application 200 can be directed to, either by preprogram or user selection, third party web sites that post coupons and rebates. The concierge application 200 can identify items in to-do list 124 and scan the third party web sites for discounts as well. For example, if the to-do entry is "purchase snow blower," the concierge application 200 can search known web sites for discounts and prices on snow blowers. The more details the user enters into the user applications, the more specific the price and location information the concierge application 200 can return.

The sale item can be placed on the list even if it is not fully consumed or on the replenishment cycle, to take advantage of the reduced price. Further, the concierge application 200 can determine which grocery store has the lowest prices for the items on the user's list and notify the user of the location. The concierge application 200 searching for the best prices for goods is not limited to foodstuffs; gasoline, clothing, sundries, etc. can also be searched, anything that the pricing is available that the concierge application 200 can access.

The timing of when the concierge application 200 sends notices may be set to use context. For example, even though the concierge application 200 determines that milk at home has expired, the concierge application 200 may delay sending a notice regarding obtaining milk until after working hours. In another example, a notice can be sent when the user is in proximity to the grocery store. Other items that are not marked as urgent can put on a shopping list generated by the concierge application 200. The shopping list can be a rolling list, updated as items are consumed, or a user can request the list at any time and the full list of urgent and non-urgent items can be compiled. Additionally, if the user enters a calendar 122 or to-do 124 task regarding shopping for these items, the concierge application 200 can take an inventory and compile the list in advance of the task date and/or time.

Further examples of the concierge application 200 can cross-reference recipes, meal plans and inventory. A user can ask the concierge application 200 to search both the available items at home with the user's recipes and determine a meal that the user can cook with the items at hand. Alternately, the user can enter a meal plan outlining meals for any period of time and the concierge application 200 can determine what items are already available at the user's house and generate a list containing the ingredients missing but needed for the recipes.

The above inventory options can be preset with the concierge application 200 or the user can set any or all of the parameters, including stores, items, replenishment cycles, types and frequency of notifications, and the related user applications. Additionally, if the user should go to multiple stores to acquire all of the items identified on list, the concierge application 200 can suggest a route based on time of day, traffic conditions.

Details regarding which stores a user frequents for particular items can be built up over time. The concierge application 200 can learn, for example, that the user frequents a butcher and a cheese shop along with a typical grocery store. Thus, when the user's food list includes "pork roast," "smoked gouda" and other food items, it can route the user to all three locations. This is the same for other items, which can include medication and clothing.

As the concierge application 200 accumulates more and more information regarding the user, habits, favorite items, and frequented stores can be noted, and with the user's permission, shared with advertisers. Advertisers can then send notices of sales or specials, or for a particularly scarce item, the time of arrival of the delivery. The user can receive personalized information to make more productive stops for goods.

Other examples of a method and an article of manufacture can include the below. The article of manufacturing can include at least one machine readable storage medium. The method can have the following steps while the article can include programming instructions embodied in the recording medium for execution. The programming can configure the mobile station 100. FIG. 7A illustrates these steps/programming instructions to provide a contextual reminder to the mobile station. Either the mobile station 100 or a server (not illustrated) communicating with the mobile station can determine a locus of the mobile station 100 (step 700). A locus, in this example, is the position of the mobile station 100 in both time and space. That is to say the locus is based on the time and the date as determined by the mobile station 100 or the cellular network (not illustrated) and the geographical position reported by GPS application 128 or similar means to locate the mobile station 100.

A first entry is read or obtained, where the first entry can be a task, as entered in the to-do list 124, or an event entered in the calendar 122 (step 702), among others. Both tasks and events can include a time, a date, and/or a location. The locus and the first entry can be compared to determine if a contextual reminder should be provided to the mobile station 100 (step 704). The contextual reminder 800 can be provided to the mobile station 100 based on the comparison (step 706). The reminder 800 can be provided when at least one of the time, the date or the geographical position of the mobile station 100 is proximate to at least one of the time, date, or location of the entry.

As discussed in the examples above, a contextual reminder 800 can be a reminder that is triggered by, or provided to the user, based on two or more parameters. The parameters can include time, location, destination, other tasks, other calendar events, priority, and category. This includes if the entry is shared. Contextual reminders 800 can take the format of a typical reminder (such as "pick up dry cleaning") or can take additional forms since they have more information and context. FIG. 8A illustrates a contextual reminder 800 that was triggered by the user's proximity to the location of the task. The reminder 800 can include the notation that is part of the entry 802, and one or both of the distance to 804 or time to 806 the location of the task. Additional features include either providing, or providing the options to display directions to the entry location 808 or the option to call the service provider 810 or store.

FIG. 8B illustrates another type of contextual reminder 800, this one is an example of linked mobile stations. As before, the notation 802, the distance to the location 804 and the time to the location 806 for the mobile station 100 can be provided. In addition, since the mobile station is linked to a mobile station of a second user, information regarding the second user can be displayed. This can include the name of the second user or second mobile station 812, the locus of the second mobile station 820, since the reminder 800 shows the location and the time and date are presumed to be contemporaneous with the reminder 800. If the time and date are not contemporaneous with the reminder 800, additional information can be provided, e.g., "in approximately 15 minutes Mobile Station 2 will be at . . . " or the information provided is this instance is a location only. Other information includes the distance 814 or time 816 the second user is from the entry location (e.g., the drycleaners). Further, a determination of which user is closest to the entry location 818 can be displayed. The proximity of the two users can be determined by distance or time to the location. The determination can be made by what time or distance reported from one mobile station to the other. Alternately, the mobile stations can exchange loci or geographic locations and one or both of the mobile stations calculate the relative distances for both mobile stations. Also, the option can be provided for one user to call the other user 822 to coordinate the completion of the entry.

Turning to FIG. 7B, additional examples of steps and programming instructions can include that one or both of determining the locus (step 700) or obtaining the first entry (step 702) can access two or more of the user applications to retrieve the time, the date, the geographical location, the entry time, the entry date, the entry location, the task, and the event (step 710). Since the accessing step can be used for both or either the determining and obtaining steps, FIG. 7B illustrates an "and" junction 701. The user applications can be, as above—for example, the contact list 120, calendar 122, the to-do list 124, e-mail 126, the GPS application 128, phone applications 130 and financial applications 132. Once the information is accessed, the decision flow can merge (junction 703) to the comparison noted above (step 704).

Figure 7C:
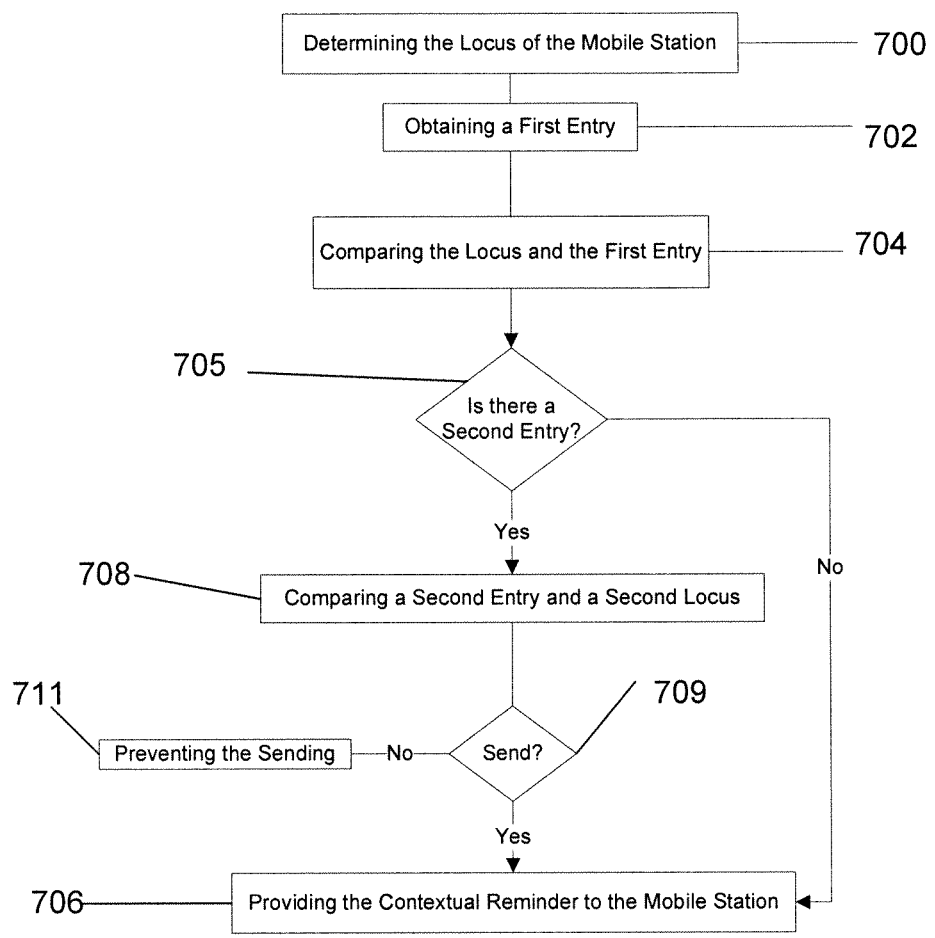

The comparing step, as illustrated in FIG. 7C, can also include determining if there is a second entry or second locus (step 705). The second event or locus can be scheduled on the user's mobile station 100. If it is determined that there is a second entry or second locus, the concierge application 200 can compare at least one of a second entry and a second locus to at least one of the locus and the entry as part of the determination (step 708) for the contextual reminder 800. The concierge application 200 can then determine to send the contextual reminder based on the proximity of the second event or the second locus to the present locus of the mobile station (step 709). Proximity can be based on the context of preset or user selections and can vary with event and location. Ranges can be input, in time or distance, where it may not be appropriate to send a reminder. If it is determined that the proximity between the two events is small, i.e., there is not enough time given the scheduling of the events and the distance between them, the concierge application can prevent the sending of the contextual reminder (step 711). To the contrary, if it is determined that the proximity between the two events is not small, the concierge application can allow the contextual reminder to be sent to the mobile station (step 706).

These are items that are close in space and/or time to the noted entry. As used in the examples above, the entry can be "pick up dry cleaning" and the second event can be the meeting scheduled for 15 minutes later. In this example, the meeting is too close in time (or too far in distance) for the user to stop and complete the task and still make the meeting on time. Thus, the concierge application 200 may not provide the contextual reminder.

Further to the dry cleaning example above, the concierge application 200 can take into account priorities. Certain entries can be noted have having higher priorities than others, which can override other considerations. In the example above, the user can be leaving on a trip the next day, and marks the task as "high priority" to make sure he has his clothes to travel with. Also, the meeting can be marked as a lower priority, and the concierge application 200 can then take in to account the prioritization and send the contextual reminder. In this context, the concierge application 200 can be preprogrammed or learn which items typically take precedence over others, e.g., food shopping always takes precedence over dry cleaning.

Also, there can be acceptable time windows that are present or set by the user to be "acceptably late." These can be a standard increment, e.g., always allow for being up to 2 minutes late, or a flexible increment based on priority and/or event. For example, never late for a work meeting, but it is acceptable to be 15 minutes late to the gym after work.

In another example, the concierge application 200 can note that the user is headed to a birthday party and can send a reminder to the user to pick up a gift, when the user is within a default or pre-set distance of a shopping mall. This can be in response to the unacknowledged "to-do" to get the gift. Entries or locus or locations are proximate if they are within a default or pre-set gap in time, date, or geographical location of each other. The gap can be defaulted for every entry or for sub-sets of entries.

Figure 7D:
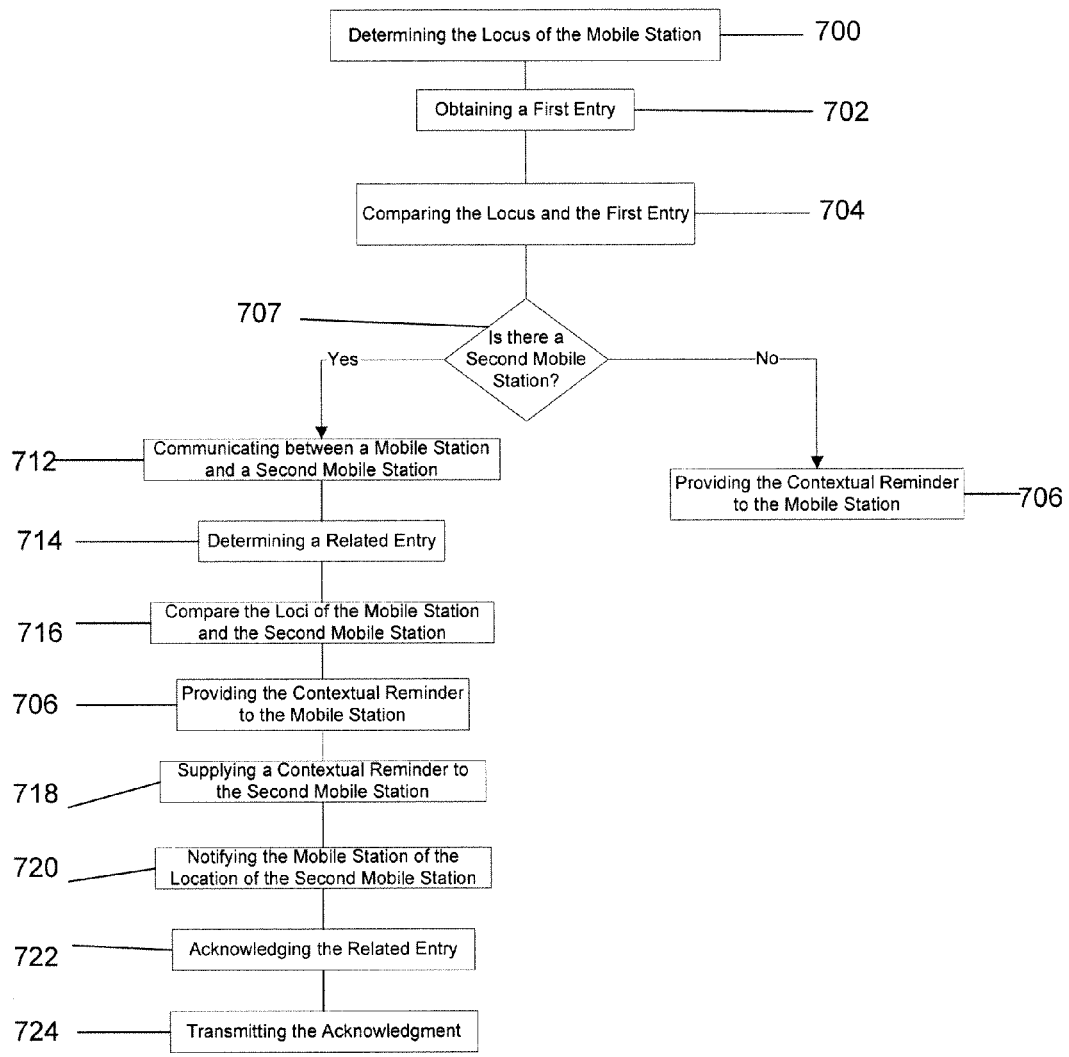

In another example illustrated in FIG. 7D, the mobile station can determine if there is a second mobile station (step 707), and if so, can communicate with it (step 712). The communication can include at least the locus and/or the entry on the mobile station. Using that information, or more, the concierge application 200 can determine if there is a related entry on the second mobile station based on the entry from the mobile station (step 714). A related entry can be an entry that is identical or is a linked entry in a particular category, as discussed above. This related entry is on the second mobile station. If the related entry is determined, the loci of the mobile station and the second mobile station and the location of the related entry can be compared (step 716).

Depending on the comparison, which can include the proximity to the location of the related entry in either space or time, a contextual reminder can be supplied to the second mobile station (step 718). Further, the providing step (706) can include the step of notifying the mobile station of at least the location of the second mobile station (step 720). Also, the contextual reminder provided in the notification can include at least one of the locus or location of the second mobile station 820, the description of the related entry 802, and a distance in length 814 or time 816 the second mobile station is from the related entry location. Furthermore, either the user of the mobile station or the second mobile station can acknowledge the related entry as complete (step 722). That acknowledgment can be transmitted to the other of the mobile station or the second mobile station (step 724) to make the other user aware that the entry is complete.

Figure 7E:
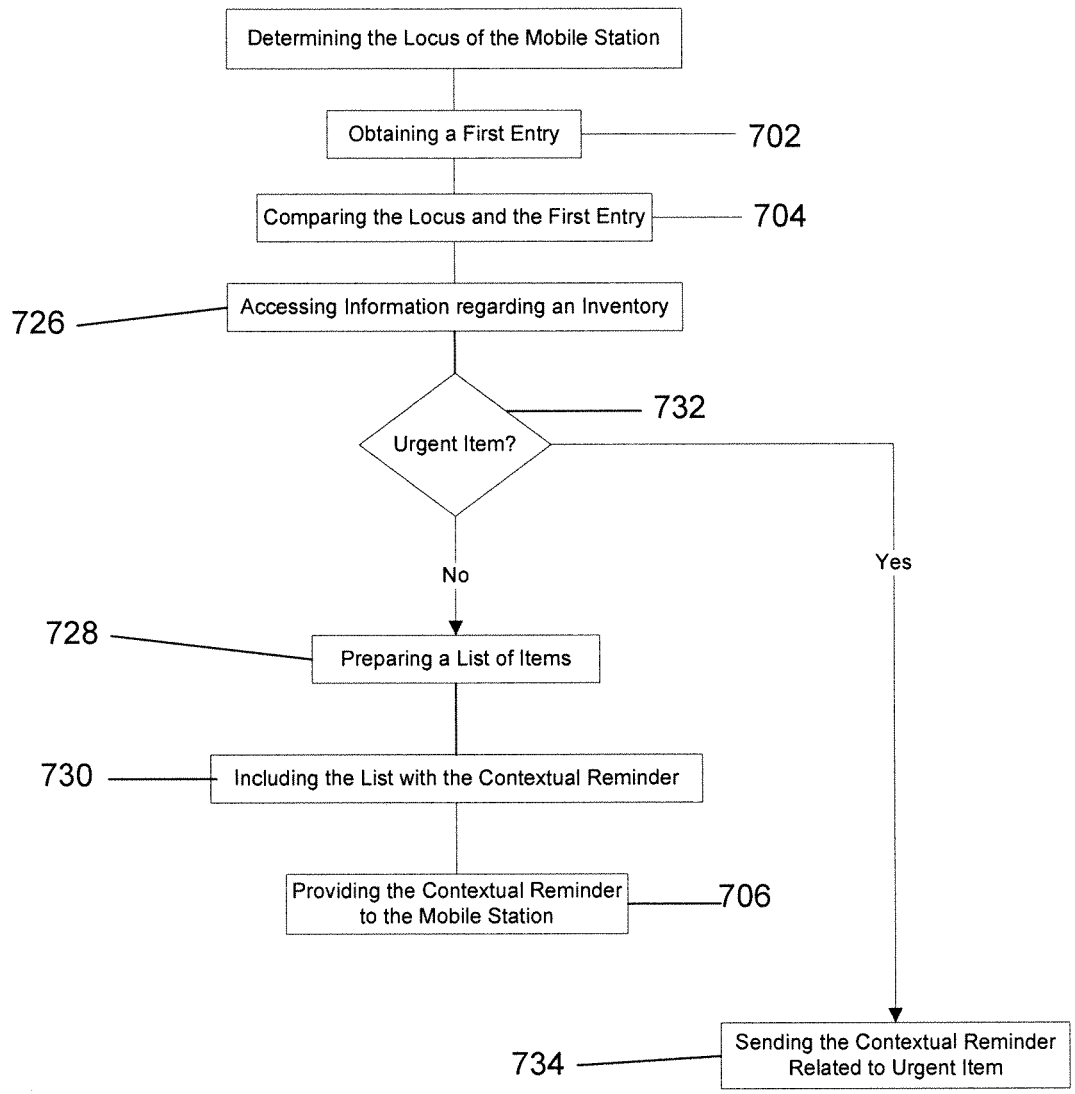

Regarding another of the above examples, FIG. 7E illustrates an example of inventory features of the concierge application. The concierge application 200, depending on the entry, or a user request, can access information regarding an inventory related to the entry (step 726). From the information, a list of items can be prepared (e.g., a shopping list) (step 728) and the list of items can be included with the contextual reminder (step 730). Then, as above, the contextual reminder is sent to the mobile station (step 706).

Optionally, as noted above, the inventory can be accessed to determine if an item is an urgent item (step 732). "Urgency" can be a preference (e.g., the user's favorite cookie), an expiration date (e.g., the milk has gone sour), a discounted price (e.g. napkins are on sale), or a replenishment cycle (e.g., its time to replace the water filters). The contextual reminder can then be sent related only to the urgent item (step 734). If multiple urgent items exist when the inventory is accessed, all of the urgent items can be included in a single contextual reminder (e.g., in independent lines). Alternatively, the urgent items may be grouped into classes (e.g., all grocery in one class, services such as dry cleaning in another class) and a single contextual reminder sent for each class of urgent items (again, notifications within each contextual reminder separated into different lines). Alternatively, each urgent item may engender the transmission of a separate contextual reminder.

The urgent contextual reminder can be sent regardless of the user's locus and other entries. The urgency of the event and time which occurs can be the contextual elements for the reminder. To further the above grocery example, a reminder to pick up milk, since it has been consumed, can be sent regardless if the user is at work or home and her distance to the nearest grocery store. The non-urgent items can have a "standard" contextual reminder that can also take into account locus and surrounding events.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the various country determination and technology detection lists. The programming code is executable by a microprocessor of the mobile station 100, e.g. from storage in a flash memory. For downloading and installation, however, the software is stored within the general-purpose computer platform.

Figure 9:
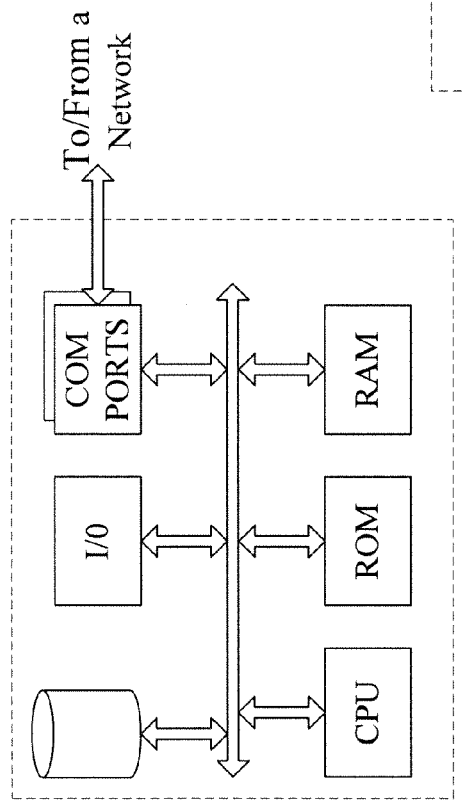
FIG. 9 is simplified functional block diagram of a computer that may be configured as a host or server.
Figure 10:
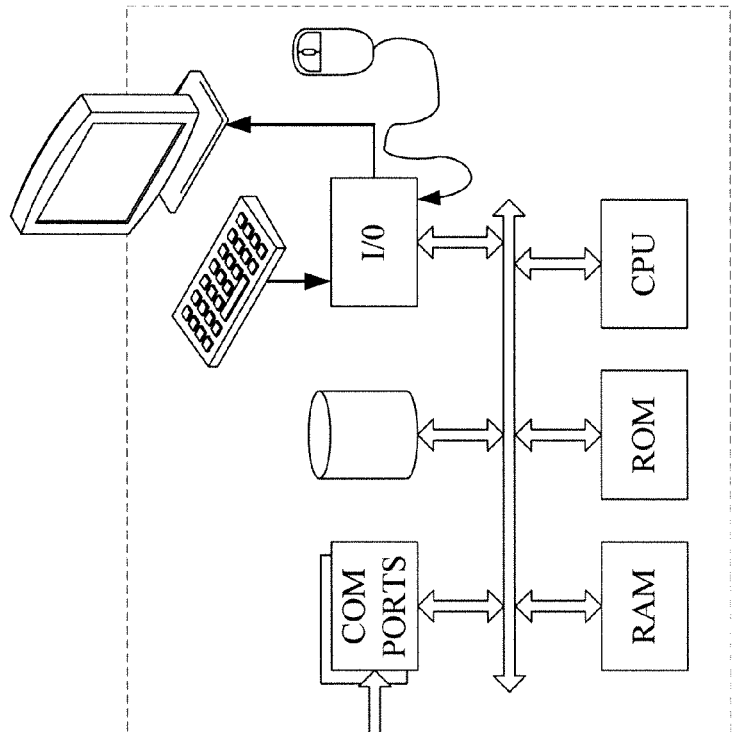
FIG. 10 is a simplified functional block diagram of a personal computer or other work station or terminal device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of mobile network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from a server or other computer of the mobile network operator into the mobile station(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising the steps of:
   determining, by a mobile station, a current locus of the mobile station based on a time, a date and a geographical position of the mobile station;
   obtaining a first entry from at least one user application on the mobile station, wherein the first entry describes at least one of a task or an event and comprises at least two of a first entry time, a first entry date, and a first entry location;
   comparing at least one of the current locus or a second locus and at least one of the first entry or a second entry to determine if a contextual reminder should be provided to the mobile station; and
   providing the contextual reminder to the mobile station based on the comparison step when it is determined that at least two of the time, the date or the geographical position of the mobile station are proximate to at least two of the first entry time, the first entry date, or the first entry location.

2. The method of claim 1, wherein at least one of the determining step or the obtaining step comprises accessing two or more user applications on the mobile station to retrieve the at least one of the time, the date, the geographical location, the first entry time, the first entry date, the first entry location, the task, and the event.

3. The method of claim 1, wherein:
   at least one of the second event or the second locus is proximate to at least one of the first entry or the current locus by at least one of the time, the date, the geographical location, the first entry time, the first entry date, and the first entry location, and
   the method further comprises steps of:
   determining whether to provide the contextual reminder based on the proximity of the second event or the second locus, and
   preventing the providing of the contextual reminder if the proximity is small.

4. The method of claim 1, further comprising the steps of:
   communicating, between the mobile station and a second mobile station, at least one of the current locus and the first entry;
   determining if there is a related entry, based on the first entry, on the second mobile station;
   comparing the current locus of the mobile station to a second mobile station locus and to a related entry location; and
   providing a contextual reminder to the second mobile station based on the comparison of the current locus of the mobile station to the second mobile station locus and to the related entry location when it is determined that at least the second mobile station locus and the current locus of the mobile station are proximate to the related entry location,
   wherein the providing step includes notifying the mobile station of at least a second mobile station location.

5. The method of claim 4, wherein the contextual reminder provided in the providing step includes at least one of the locus of the second mobile station, the related entry, or a distance the second mobile station is from the related entry location.

6. The method of claim 4, further comprising the steps of:
receiving a user-provided acknowledgment of the related entry as complete on at least one of the mobile station or the second mobile station; and
transmitting the received acknowledgment to the other of the mobile station or the second mobile station.

7. The method of claim 1, further comprising the steps of:
accessing information regarding an inventory related to the first entry;
preparing a list of items from the information; and
including the list of items with the contextual reminder.

8. The method of claim 7, further comprising the steps of:
determining from the information if an item related to the inventory is an urgent item; and
providing the contextual reminder related only to the urgent item;
wherein the urgent item is identified as urgent based on at least one of a preference, an expiration date, a discounted price, or a replenishment cycle.

9. An article of manufacture, comprising:
at least one machine readable storage medium; and
programming instructions embodied in said at least one medium for execution by a mobile station, wherein the programming configures said mobile station to be capable of performing functions for communicating between applications on the mobile station, including functions to:
determine a current locus of the mobile station based on a time, a date and a geographical position of the mobile station;
obtain a first entry from at least one user application on the mobile station wherein the first entry describes at least one of a task or an event and comprises at least two of a first entry time, a first entry date, and a first entry location;
compare at least one of the current locus or a second locus and at least one of the first entry or a second entry to determine if the contextual reminder should be provided to the mobile station; and
provide the contextual reminder to the mobile station based on the comparison step when at least two of the time, the date or the geographical position of the mobile station are proximate to at least two of the first entry time, the first entry date, or the first entry location.

10. The article of claim 9, wherein the determining function further comprise the function to:
access two or more user applications on the mobile station to retrieve at least one of the time, the date, the geographical location, the first entry time, the first entry date, the first entry location, the task, and the event.

11. The article of claim 9, wherein:
at least one of the second event or the second locus is proximate to at least one of the first entry or the current locus by at least one of the time, the date, the geographical location, the first entry time, the first entry date, and the first entry location; and
the functions further comprise the function to:
determine whether to provide the contextual reminder based on the proximity of the second event or the second locus, and
prevent the providing of the contextual reminder if the proximity is small.

12. The article of claim 9, wherein the functions further comprise the functions to:
communicate, between the mobile station and a second mobile station, at least one of the current locus and the first entry;
determine if there is a related entry on the second mobile station based on the first entry;
compare the current locus of the mobile station to a second mobile station locus and to a related entry location; and
provide a contextual reminder to the second mobile station based on the comparison of the current locus of the mobile station to the second mobile station locus and to the related entry location when it is determined that at least the second mobile station locus and the current locus of the mobile station are proximate to the related entry location,
wherein the providing step includes notifying the mobile station of at least a second mobile station location.

13. The article of claim 12, wherein the contextual reminder provided in the providing step can include at least one of the locus of the second mobile station, the related entry, or a distance the second mobile station is from the related entry location.

14. The article of claim 12, wherein the functions further comprise the functions to:
receive a user-provided acknowledgment of the related entry as complete on at least one of the mobile station or the second mobile station; and
transmit the received acknowledgment to the other of the mobile station or the second mobile station.

15. The article of claim 9, wherein the functions further comprise the functions to:
access information regarding an inventory related to the first entry;
prepare a list of items from the information; and
include the list of items with the contextual reminder.

16. The article of claim 15, wherein the functions further comprise the functions of:
determine from the information if an item related to the inventory is an urgent item; and
provide the contextual reminder related only to the urgent item;
wherein the urgent item is identified as urgent based on at least one of a preference, an expiration date, a discounted price, or a replenishment cycle.

* * * * *